United States Patent
Abramovich et al.

(10) Patent No.: US 8,406,487 B2
(45) Date of Patent: Mar. 26, 2013

(54) METHOD AND SYSTEM FOR CONTACTLESS FINGERPRINT DETECTION AND VERIFICATION

(75) Inventors: Gil Abramovich, Niskayuna, NY (US); Kevin George Harding, Niskayuna, NY (US); Qingying Hu, Bellevue, WA (US); Swaminathan Manickam, Bellingham, MA (US); Meena Ganesh, Clifton Park, NY (US); Christopher Allen Nafis, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 563 days.

(21) Appl. No.: 12/694,840

(22) Filed: Jan. 27, 2010

(65) Prior Publication Data

US 2011/0064282 A1    Mar. 17, 2011

Related U.S. Application Data

(60) Provisional application No. 61/242,819, filed on Sep. 16, 2009.

(51) Int. Cl.
G06K 9/00 (2006.01)
G02B 5/30 (2006.01)
G02B 27/28 (2006.01)

(52) U.S. Cl. .......... 382/127; 382/124; 359/489.01; 359/489.15

(58) Field of Classification Search .......... None
See application file for complete search history.

(56) References Cited

U.S. PATENT DOCUMENTS

| 3,278,752 | A * | 10/1966 | Brixner | 250/216 |
|---|---|---|---|---|
| 4,783,152 | A * | 11/1988 | Nishimoto | 359/319 |
| 6,483,932 | B1 | 11/2002 | Martinez et al. | |
| 2002/0131624 | A1 | 9/2002 | Shapiro et al. | |
| 2005/0265586 | A1 | 12/2005 | Rowe et al. | |
| 2006/0038929 | A1* | 2/2006 | Wang | 349/18 |
| 2008/0007507 | A1 | 1/2008 | Kim et al. | |
| 2008/0101664 | A1 | 5/2008 | Perez | |
| 2008/0232653 | A1* | 9/2008 | Rowe | 382/124 |
| 2008/0253626 | A1* | 10/2008 | Shuckers et al. | 382/125 |
| 2009/0080709 | A1 | 3/2009 | Rowe et al. | |
| 2009/0226054 | A1* | 9/2009 | Jelinek | 382/126 |
| 2010/0214527 | A1* | 8/2010 | Yue et al. | 349/196 |

FOREIGN PATENT DOCUMENTS

| EP | 1805690 B1 | 4/2008 |
|---|---|---|
| JP | 2001167255 A | 6/2001 |
| JP | 2008-48903 A | 3/2008 |
| WO | WO2008078895 A1 | 7/2008 |

OTHER PUBLICATIONS

Chen et al, "3D Touchless Fingerprints: Compatibility with Legacy RolledImages," 2006, Biometric Consortium Conference, pp. 1-6.*

(Continued)

*Primary Examiner* — Andrew W Johns
*Assistant Examiner* — David F Dunphy
(74) *Attorney, Agent, or Firm* — Eileen B. Gallagher

(57) ABSTRACT

This invention provides a method for contactless fingerprint detection and verification comprising illuminating a fingerprint and directing a reflected light through an imaging system using liquid crystal panels and birefringent elements to polarize the light. A plurality of polarized images are captured and used to calculate the depth of structural features on the fingertip. A means to generate a two-dimensional rolled equivalent image of the fingerprint is also provided which may then be used for verification and authentication. The invention also provides an imaging system for carrying out the method.

24 Claims, 12 Drawing Sheets

OTHER PUBLICATIONS

Abramovich et al., Real-Time 3D Part Metrology Using Polarization Rotation, GE Global Research, Technical Information Series, 14 pages, Jul. 2009.

Favaro et al., "Learning Shape from Defocus", Department of Electrical Engineering, Washington University, St. Louis, MO 63130, USA, fava@ee.wustl.edu, 13 pages.

Chen et al., "3D Touchless Fingerprints: Compatibility With Legacy Rolled Images", Michigan State University, Department of Computer Science and Engineering, East Lansing, Michigan 48824, 6 pages.

Ratha et al., Touchless Fingerprinting Technology, Advances in Biometrics, 4 pages, 2008.

Coty, Biometric Detector, An S&T Innovation/HSARPA HITS Program, S&T Stakeholders Converence, 13 pages, May 21-24, 2007.

"3-D Light System Revolutionizes Way Fingerprints are Taken", Published on NetworkWorld.com Community (http://www.networkworld.com/community), pp. 1-3, created Mar. 12, 2009.

* cited by examiner

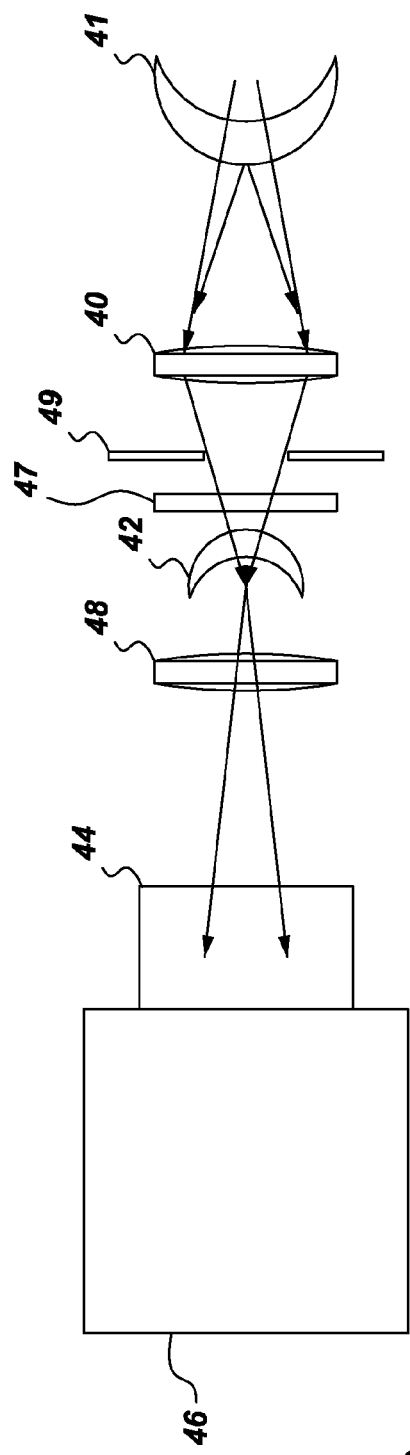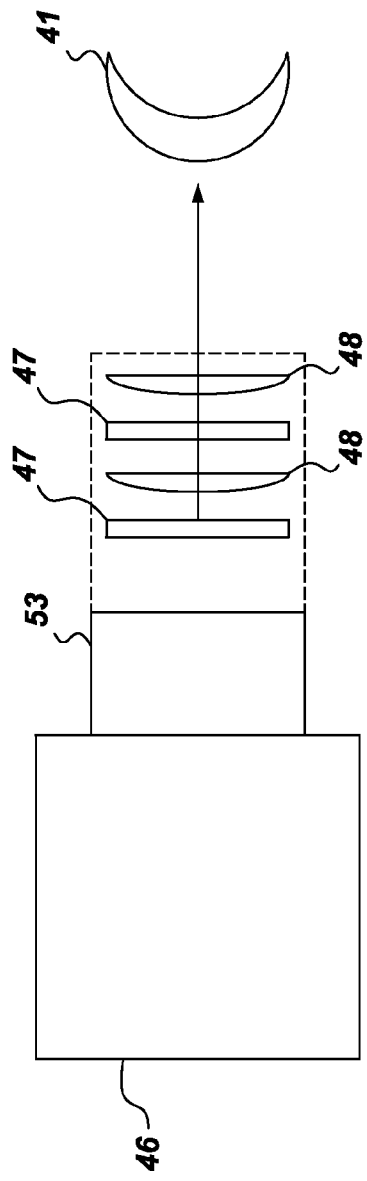
Fig. 3
Fig. 4

METHOD AND SYSTEM FOR CONTACTLESS FINGERPRINT DETECTION AND VERIFICATION

CROSS-REFERENCE TO RELATED APPLICATIONS

This application claims priority to U.S. provisional patent application No. 61/242,819 filed Sep. 16, 2009; the disclosure of which is incorporated herein by reference in its entirety.

STATEMENT REGARDING FEDERALLY SPONSORED RESEARCH & DEVELOPMENT

This invention was made with Government support under contract number HSHQDC-08-C-00042 awarded by the Department of Homeland Security. The Government has certain rights in the invention.

BACKGROUND

Typically fingerprints have been imaged using contact based fingerprint readers that require a subject's finger to be in contact with a screen and then physically rolled across the screen to provide a full rolled-image fingerprint. Systems have been developed using a single flat image, but these do not provide the entire fingerprint data due to the imaging technique that creates contrast between fingerprint ridges and valleys, which are in contact with a glass window and a shallow depth-of-field of most imaging system which prevents all areas of the finger, for example the tops and sides, from being in clear focus in the same image. Multiple image systems have been used to allow data capture using multiple focal points, however the ability to quickly capture the multiple images needed is limited by the means to shift the focus position quickly. Also, the speed of the system must be such that the small movement of a person holding their finger in place for imaging does not degrade the quality or position of the multiple images required.

Therefore a system is needed to collect fast images of a fingerprint without physical contact with the image reader, at a speed consistent with finger stability, and which can subsequently be compared to a rolled-image fingerprint.

BRIEF DESCRIPTION

The invention includes embodiments that relate generally to a method and systems to capture three dimensional finger shape information with sufficient resolution and depth detection to allow comparison to roll-type fingerprint images and to distinguish between an authentic fingerprint and a forgery.

Thus, provided is an imaging system for carrying out the non-contact capture of high resolution, rolled equivalent fingerprint images. Also provided is a method of capturing a rolled equivalent set of fingerprints with high image resolution without making contact with the fingers being imaged or the palm, and in a manner consistent with the physical stability of a typical person's hand.

In a first aspect, the invention provides a contactless method of imaging a three-dimensional fingerprint using polarization rotation. The method comprises illuminating a fingerprint and directing a reflected light from the fingerprint through an imaging system wherein the imaging system comprises an image capture device, a liquid crystal panel (LCP), and a birefringent element wherein the LCP and the birefringent element are positioned between the fingerprint and the image capture device such that the reflected light from the fingerprint passes through the LCP and the birefringent element. The method further comprises the steps of polarizing the reflected light, capturing a plurality of rotation angles of the linearly polarized images of the fingerprint wherein at least one image is captured from each of the polarization orientation states of the LCP, registering the plurality of images of the fingerprint to create a fused image, calculating a depth of structural features of the fingerprint using a depth from focus algorithm, and generating a two-dimensional rolled image of the fingerprint from the calculated depth of structural features and the fused image using an algorithm wherein the algorithm creates image distortion corresponding to the reverse of the projection of the fingerprint surface on a two dimensional projection.

In a second aspect, the invention provides a contactless system for imaging a fingerprint using polarization rotation. The system comprises an illumination source for directing illuminating light towards a fingerprint, an image capture device for capturing reflected light from the fingerprint; a first liquid crystal panel (LCP), and a first birefringent element wherein the first LCP and the first birefringent element are positioned between the fingerprint and the image capture device such that reflected light from the fingerprint passes through the LCP and the birefringent element. The system further comprises a voltage source to apply voltage to the first LCP to change orientation states, and a processor coupled to the image capture device. The processor is capable of calculating the depth of structural features of the fingerprint using a depth from focus or a depth from defocus algorithm, and generating a two-dimensional rolled image of the fingerprint from the calculated depth of structural features and the fused image using an algorithm wherein the algorithm simulates image distortions obtained using a contact method.

DRAWINGS

These and other features, aspects, and advantages of the present invention will become better understood when the following detailed description is read with reference to the accompanying drawings in which like characters represent like parts throughout the drawings, wherein:

FIG. 3 is an illustration of an imaging system, using a birefringent lens as a magnifying lens, forming an intermediate image.

FIG. 4 is an illustration of a birefringent element and LCP placed in front of a single imaging lens.

DETAILED DESCRIPTION

Figure 1:
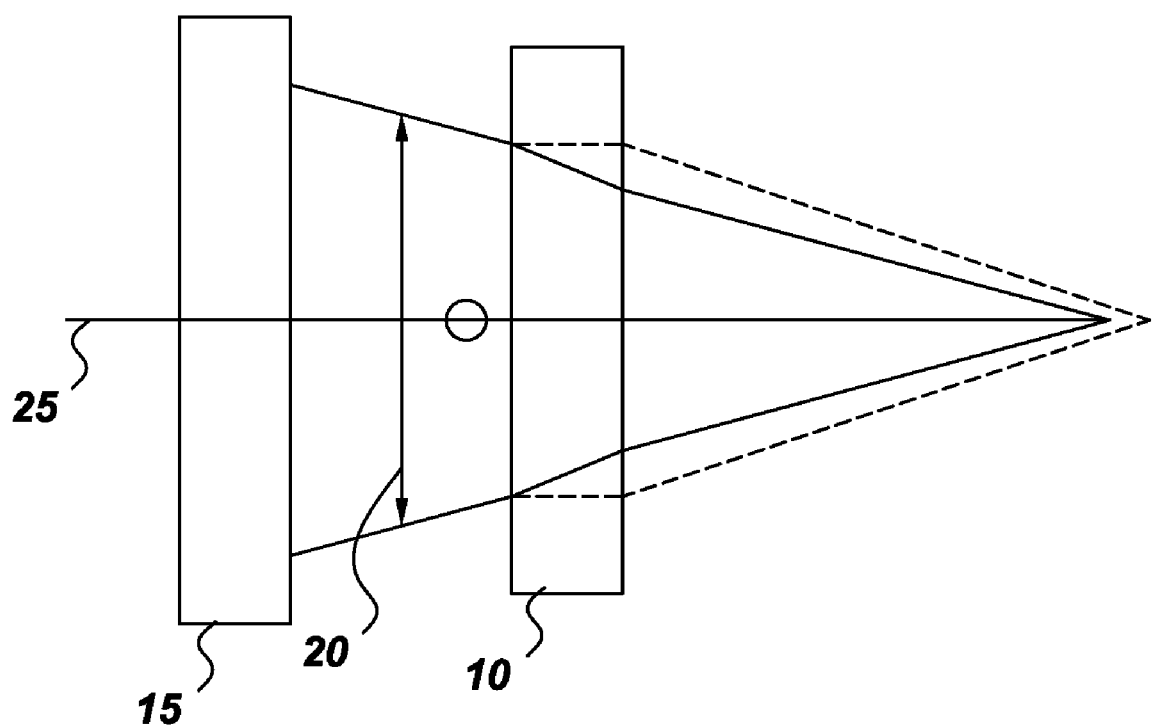
FIG. 1 is an illustration of focal shift using a birefringent window.

In depth from focus, a series of images is taken, each with a shallow depth-of-field, stepping by one depth-of-field in depth. By finding those locations in each image, where the image is in best focus, and building the data a step at a time from that information, a full 3D data set is generated. In the simplest form of depth from focus or defocus, information is taken at a large number of images, and the set is searched for those that have the least amount of blur. Some microscope systems use this approach to define regions within each image that are in best focus, and combining these regions to build up a single in-focus image. White light interferometers effectively use this method to build up large depths by mechanically stepping in distance to build up a precision shape, one micron at a time.

In depth from defocus, fewer images can be taken, and the degree of defocus is modeled. The amount of defocus blur can be used to estimate how far a particular image feature is from best focus. In this case, the blur is typically modeled as a convolution of the in-focus image and an effective point spread function that can be calculated geometrically from:

$$R=\{D/2\}\times\{1/f-1/o-1/s\}$$

where R is the blur radius, D the diameter of the collection aperture, f the focal length of the lens, o the object distance to the subject, and s the image distance to the sensor. In structured light based depth-from-focus, the structured pattern needs to be separated from the texture. This estimation can be done using a local operator over x and y of the form:

$$S(x,y)=e-(x'^2+y'^2)/2a2\times\cos(2(pi)/T\times x'+(phi))$$

$$x'=x\cos(theta)-y\sin(theta)$$

$$y'=x\sin(theta)+y\cos(theta)$$

where 'T' is the primary period of the pattern projected on the subject, 'a' is the standard deviation of the equivalent Gaussian filter, (theta) the angle of illumination to the surface normal, (phi) the phase offset. These approaches assume that the effect of blur is primarily to spread the pattern projected, and to decrease in the rate of change of intensity (derivative of the contrast) of the edges. In some cases, such as auto focus systems, just the contrast of edges is considered in each area. Alternately, the frequency content of the fuzziness is often modeled as a Laplacian calculated around a narrow band of the primary frequency (spacing) of the pattern projected onto the part.

For an imaging system, the depth of focus and the system resolution usually conflict: the higher the resolution, the smaller the depth over which the imaging system can focus and capture a clear image. For fingerprint detection, both high resolution and high imaging depth are desirable. High resolution is needed for imaging features like ridges and creases on a fingerprint. The curvature round off on fingers requires high detectable depth as does size variation and various stand-off distances of fingers from the detector itself. To meet the working depth requirement, a motorized focus lens may be used. However a motorized focus lens may increase the size of the detector, add to the system cost, and slow down the process due to the required focus movement. As such a mechanical means to accurately shift the focus of the image is not desirable.

In one embodiment an imaging system is used to image a fingerprint, using an imaging element, such as a lens, having a set optical path length and focal point. An LCP (liquid crystal panel) and a birefringent optical is positioned between the imaging element and the subject's finger to change the optical path length of the imaging system. A birefringent optical element is an element whose optical path length is dependent upon the orientation of the polarization of the light and may be refer to a birefringent window or lens depending on geometry.

This results in two or more optical paths of different lengths, which causes a refocus of the resulting fingerprint image. The change in optical path length by the LCP and birefringent optical element has the same effect on the focus/defocus of the image, as would a change in the physical distance between the finger and the imaging system. Data from the fingerprint images from the focused and refocused optical path lengths are used to calculate depth of the three-dimensional (3D) structures of the fingerprint and to generate a topographical map. This may be referred to as a depth from focus or a depth from defocus calculation. The topographical map may then be transformed into a two-dimensional rolled-out version of the 3D fingerprint.

In accordance with one embodiment, a method is described in which an LCP and birefringent element is attached to the camera lens and a supplied electronic signal (voltage) is used to control the polarization rotation caused by the liquid crystal. One or more different voltages are applied causing the polarization rotation caused by the LCP to change. Subsequently this causes the light to see a different index of refraction path within the birefringent element resulting in a different optical path length. Any variation in the optical path length results in changes in the focus/defocus on the images similar to a physical change in the distance between the finger and the camera.

In each instance the image of the finger may be captured using an image capture device, which is composed of a camera or similar device, which captures the images of the object and produces the captured image data on the basis of time or spatial parameters. Similarly the imaging system may comprise additional components typically found in optical systems such as, but not limited to, additional lens, mirrors, light filters, apertures, illuminating devices, and electronic components.

Various methods exist for generating the focus shifts needed for determining the depth of structural features of a fingerprint using an LCP and birefringent elements. In certain embodiments, two to three focal shifts on the order of between about 2 and about 10 millimeters are used. If the depth-of-field (DOF) of the finger is larger than the focal shift, the images created will have an overlapping focus with the central 'best focus' regions to either side of the overlap area. Depth-of-Field (DOF) is defined as the imaging region through which a given size feature, for example the ridges on a fingerprint, do not appear to change focus. If the DOF is shorter than the path length shift, then each image will show a band of clear focus at different depths on the fingerprint. To generate a two-dimensional fingerprint with good resolution, some overlap of the focus regions is preferred.

In one embodiment, as shown in FIG. 1 a birefringent window 10 may be used with the LCP 15. The birefringent window 10 may comprise a transparent material such as, but not limited to, quartz, lithium niobate, and calcite and is cut with a fast axis 20 perpendicular to the optical axis 25 of the imaging system. When the incoming light is polarized along the fast axis, the optical path is equal to L times $n_o$. When the incoming light is perpendicular to the fast axis, the optical path is equal to L times $n_e$. The terms $n_o$ and $n_e$ refer to the refractive indices for polarizations perpendicular (ordinary) and parallel (extraordinary) to the axis of anisotropy respectively. In the case of crystal quartz, the index shift between the two orientations is around 0.018 RIU (refractive index units), such that a window, which is one centimeter thick, can provide a change in path length of 0.18 millimeters. Calcite has an index shift of about 0.16 RIU for an image shift of 1.6 millimeters for a 1-centimeter thick window. In comparison lithium niobate has an index shift of nearly 0.2 RIU, producing potential shifts of 1.9 millimeters compared to calcites' 1.6 millimeter.

Figure 2:
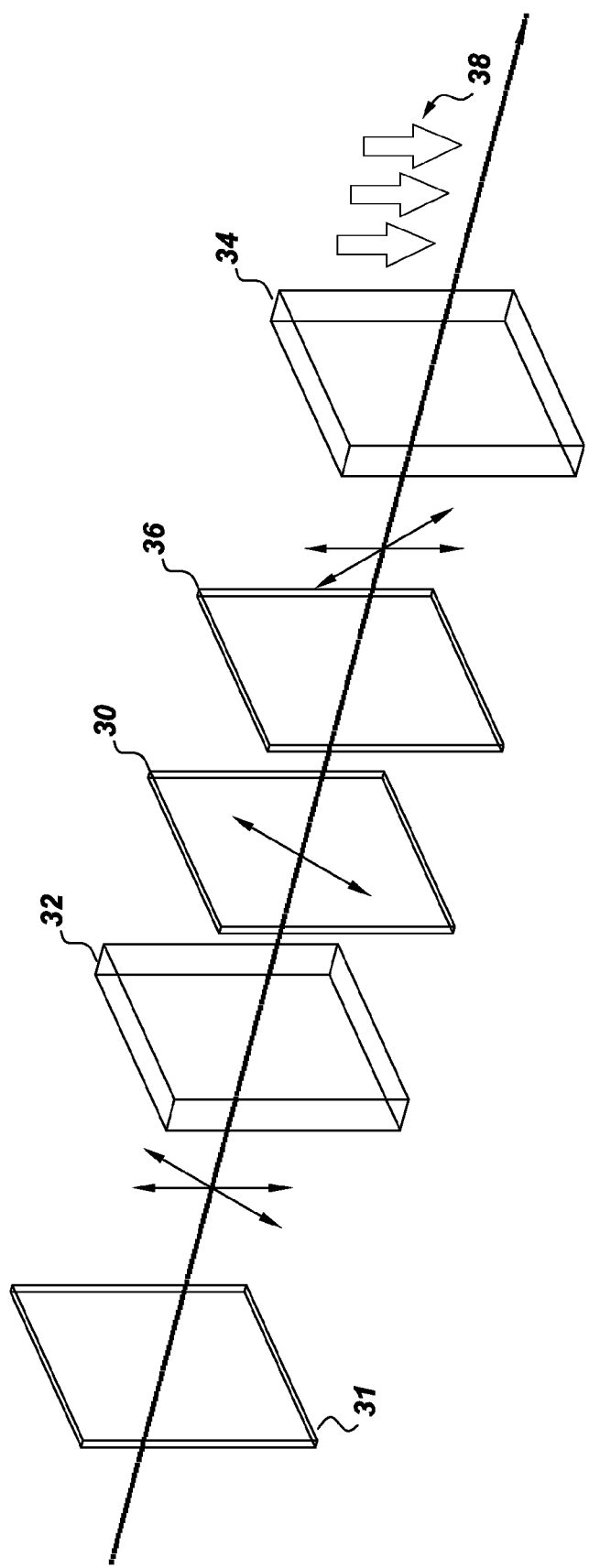
FIG. 2 is a representation of a multi-stage apparatus having tandem birefringent elements for producing 3 or 4 focal distances.

A multi-stage shifting apparatus may also be used further incorporating a polarizer and tandem birefringent elements. As shown in FIG. 2, a polarizer 30 at a set angle to two possible incoming polarizations that are perpendicular to each other may orient the polarization of the light from a LCP 31 and a birefringent element 32. In one embodiment where a polarizer 30 is set at 45°, the two possible orthogonal polarizations of incoming beams will create a beam polarized at 45°, to either of the incoming beams, but with a decrease in intensity of approximately 50 percent (including some losses). A second birefringent element 34, with the fast axis oriented parallel to the polarizer, will work with the first two orthogonally polarized incoming beams to create two focal positions. A third shift may be created with a second LCP element 36 positioned after the polarizer. If the second birefringent element 34 is of a different thickness or power from the first, then the two paths through the second element may be combined with each orientation in the first element to create two new path lengths for a total of 4 positions. If the second element is the same as the first in terms of the shift generated, then using the second path (long path) through the second element with the first path (short path) of the first element is equivalent to using the short path in the second element and the long path in the first element. This would result in a total of three measurable shift positions 38.

In certain embodiments, a lens may be used in combination with the LCP wherein the focal length of the lens is changed when voltage is applied to the LCP. The focal length of a single lens can be calculated using the simple lens maker equation:

$$\frac{1}{f} = \frac{1}{i} + \frac{1}{o} = \frac{(n-1)}{r}$$

where f is the focal length of the lens, i is the image distance, o is the object distance, n is the index of refraction at the polarization used, and r is the radius of curvature of the lens for a plano convex lens.

As an example if a lens is constructed with quartz (quartz has an index of 1.548 to 1.565) the focal length at the first index can be chosen to be 100 millimeters, giving a radius of 55 mm for a plano convex lens (the other radius being infinity). At the second index with the polarization rotated by 90° to the fast axis, the focal length is then 98.2 millimeters, a change of 1.8 millimeters. For a more birefringent material such as Calcite, the radius of curvature of the curved surface is about 48 millimeters at the fast axis polarization orientation (lower index) for a 100-millimeter focal length. Along the slow axis, the focal length is approximately 74 millimeters resulting in an optical path length shift of 26 millimeters.

In one embodiment, as shown in FIG. 3 a front imaging lens 40 may be used to form an intermediate image 42 of the subject 41, at a predetermined f-number and DOF, along with a second imaging lens 44 to adjust the magnification onto a camera 46. LCP 47 combined with birefringent lenses 48, may be used as the field optics near the intermediate image. Except for some curvature of the field, the birefringent lenses 48 have a minimal effect on the resolution quality of the image, and the position of the lenses can be adjusted to provide the amount of shift needed. A telecentric stop 49 is also used to control magnification.

The magnification of the primary and camera lens may be chosen to create the desired focal shift at the finger scanning position. In certain embodiments if an increase in focal shift is desired, a magnifier lens may also be used along with the birefringent lenses near the intermediate image location. For example, if a shift of 4 millimeters is desired at the finger scanning position, but only a 1 millimeter is created at the intermediate image by the birefringent lens element, then the image may be magnified from the intermediate image to the finger by 2×, which in focal distance would be a change of 4× (the longitudinal magnification is the square of the lateral magnification).

As shown in FIG. 4, birefringent lens elements 48 along with one or more LCP elements 47 may also be placed in front of or behind (finger or sensor side) a single imaging lens 53 at a distance shorter than the focal length of the birefringent lens element, and may function as a magnifier lens or close up diopter lens. In FIG. 4 LCP elements are shown in both locations.

In certain embodiments, one or more polarizing beam splitting cubes may be used with the LCP. In one embodiment, a beam splitting polarizer cube may be used to reflect the light at 90° relative to the incident direction so as to traverse a longer path than one, which goes directly through the cube. A cube may be used wherein the cube comprises two right angle prisms joined along their large faces to form a cube and with two side faces having a quarter wave retarder rotationally oriented at 45° between the cube and a mirror. A thin film stack of alternating high and low index materials on one of the large faces polarizes the incident light reflecting "s" polarized light and transmitting "p" polarized light. The terms "s" polarized light and "p" polarized light are defined relative to the normal plane of incidence light on the optical interface. If the light is composed of a component of the electric field along the axis orthogonal to the plane of incidence it is referred to as "s" polarized, if it is parallel to the plane of incidence it is referred to as "p" polarized.

Figure 5:
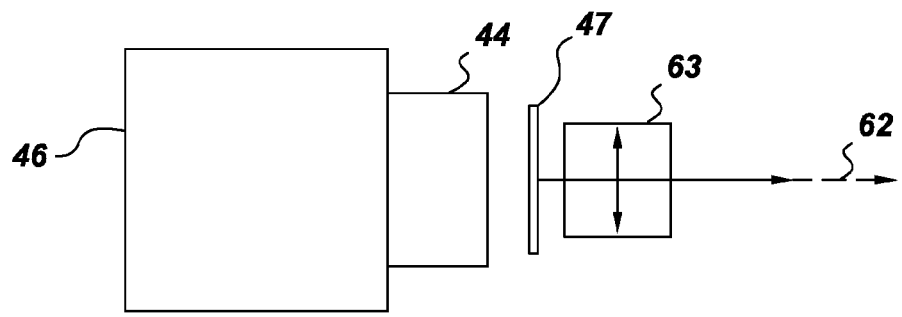
FIG. 5 is an illustration of an apparatus using polarizing beam splitting cubes.

As shown in FIG. 5, in certain embodiments, changes made by the LCP 47 may cause the image path 62 to pass directly through a beam splitter cube 63, or to reflect off the two sides of the cube before passing through to generate a second path 3× longer through the cube than the first. Using two such cubes together allows for three or four focus positions as before. If the cubes are different sizes, then the combinations provides four positions, if they are the same size there are only three unique positions.

After the fingerprint image is captured, the data is transferred to a processor and 3D depth information obtained. The 3D information may be processed and used to create a 2D rolled equivalent type image from the calculated depth of the structural features and the high-resolution fused image. An algorithm is used wherein the algorithm simulates the image distortions obtained when using a contact fingerprinting method. The image may then be compared to roll-type fingerprint images such as those stored in a fingerprint database system or in similar sources.

Figure 6:
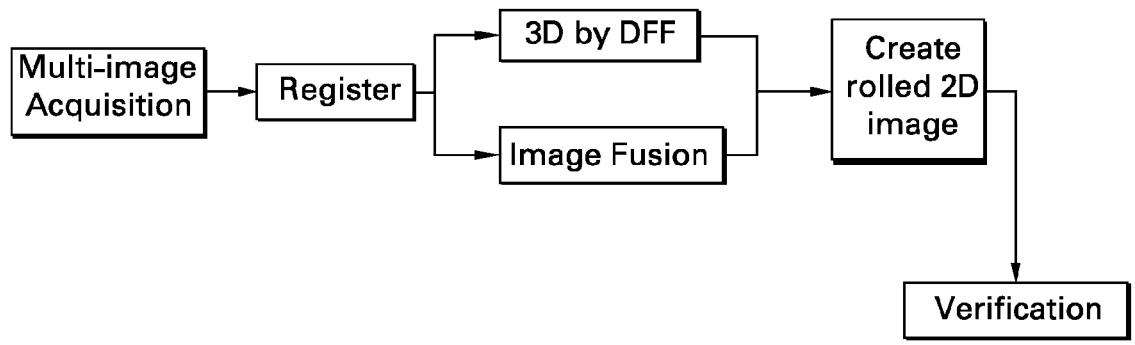
FIG. 6 is a process flow diagram used for contactless fingerprint verification.

FIG. 6 shows the process steps involved in one such embodiment. The process steps comprise image acquisition of multiple images of a fingerprint obtained from different optical path lengths, transfer of the acquired image using a processor and image registration of the multiple images. The process steps further comprise fusion of the multiple images into a composite image, determination of depth using DFF calculations, creation of a rolled two-dimensional (2D) image, and comparison of the 2D image to a finger print data base for verification. The images obtained may be stored at various points along the process.

Various methods may be used to register the image. As used herein registration refers to a process of transforming the different images of a single subject into one coordinate system. In the context of a fingerprint, registered images are derived from the captured images of the fingerprint. The registered images have the same scale and feature position.

In order to ensure the features from the multiple shifted images are approximately registered, a telecentric lens system is also commonly used that maintains magnification within a narrow range. However, the addition of a telecentric aperture inherently increases the f-number and may result in an excessive depth-of-field.

In certain registration embodiments, registration may use a geographic information system (GIS) employing ortho-rectification. Ortho-rectification is a process of remapping an image to remove the effect of surface variations and camera position from a normal perspective image. The resultant multiple images are perspective corrected projections on a common plane, representing no magnification changes with a pixel to pixel correspondence. In certain embodiments, ortho-rectification may comprise un-distorting each captured image using 3D calibration information of the image capture device, and projection of the image onto one plane.

Figure 7:
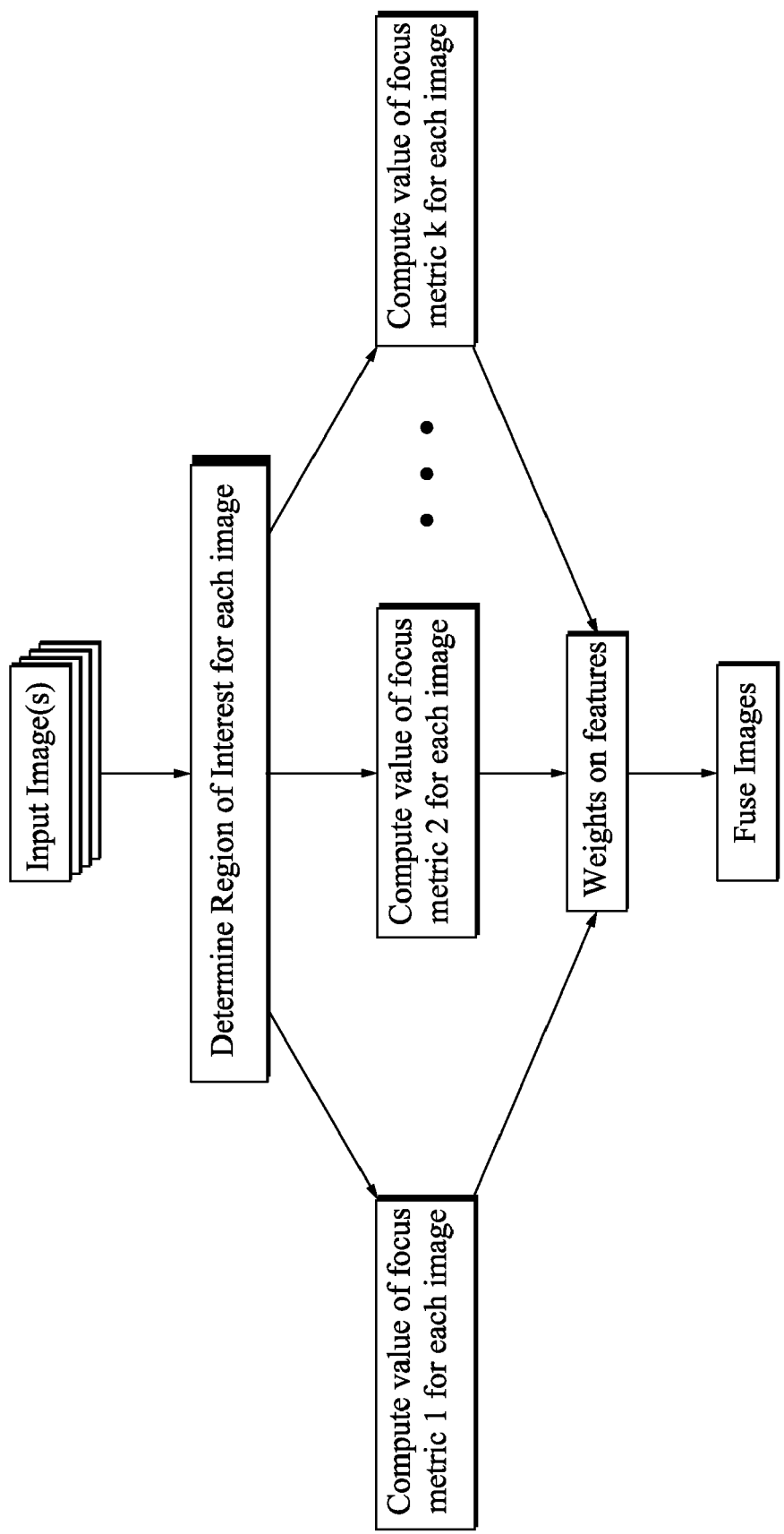
FIG. 7 is a flow diagram of an image fusion approach used to combine multiple images.

Once the images are registered, image fusion is used to create a single high-resolution image from the multiple images of the same target. Generally, image fusion is the procedure of combining information from multiple images into a single image whereas in the said embodiment this information relate to the local, spatial focus information in each image. The refused image would desirably appear entirely in-focus while the source images are in focus in different, specific regions. This may be accomplished by using selected metrics. These metrics are chosen based on the fact that the pixels in the blurred portions of an image exhibit specific different feature levels, in comparison to those pixels that are in good focus. For example, focused images typically contain higher frequencies while blurred images have lower frequency components In certain embodiments certain metrics may be used to compute the level of focus for each pixel in each separately obtained image of the fingerprint. The separate images are then normalized and combined using a weighted combination of the pixels to obtain a single fused image. An overview of the aforementioned image fusion approach is shown in FIG. 7. As shown in the process steps, for each of the acquired images, the region of interest is determined by image segmentation. From the different metrics the focus at each location in the image is calculated as a weighted combination of features, then the images are combined using said local weighted combination of the features.

In order to match the fingerprint images captured to standard databases based upon 2D data capture, the 3D model may be used to generate an unrolled 2D image. The model used, simulates the image distortions corresponding to the reverse of the projection of the fingerprint surface on a two-dimensional projection obtained in a contact method.

In one embodiment a 3D point cloud data set is generated based on pixel intensities from the plurality of polarized images. The 3D point cloud represents the visible surface of the finger. The 3D point cloud is subsequently used to create a distortion map. An algorithm, based on the distortion map transforms the pixel space of the fused image into a new pixel space. The new pixel space simulates the image distortions that would be obtained using a contact type fingerprint method.

In one embodiment, the distortion map may be based on a cylindrical approximation of a finger wherein the unrolled fingerprint width equals πr is used. As such, an angle subtended by an arc of unit length, θ, is equal to 1/r in radians. Using the equation an unrolled width is computed and each pixel assigned a projected location. Based on the projected location, a gray scale value is calculated.

In other embodiments the distortion map may be based on a cylindrical assumption using multiple cross sections of the finger perpendicular to the long dimension of the finger and by applying a Bezier curve representing the center of the finger along its long dimension. A flow chart of the process, which results in an unrolled image, is shown in FIG. 8.

Figure 8:
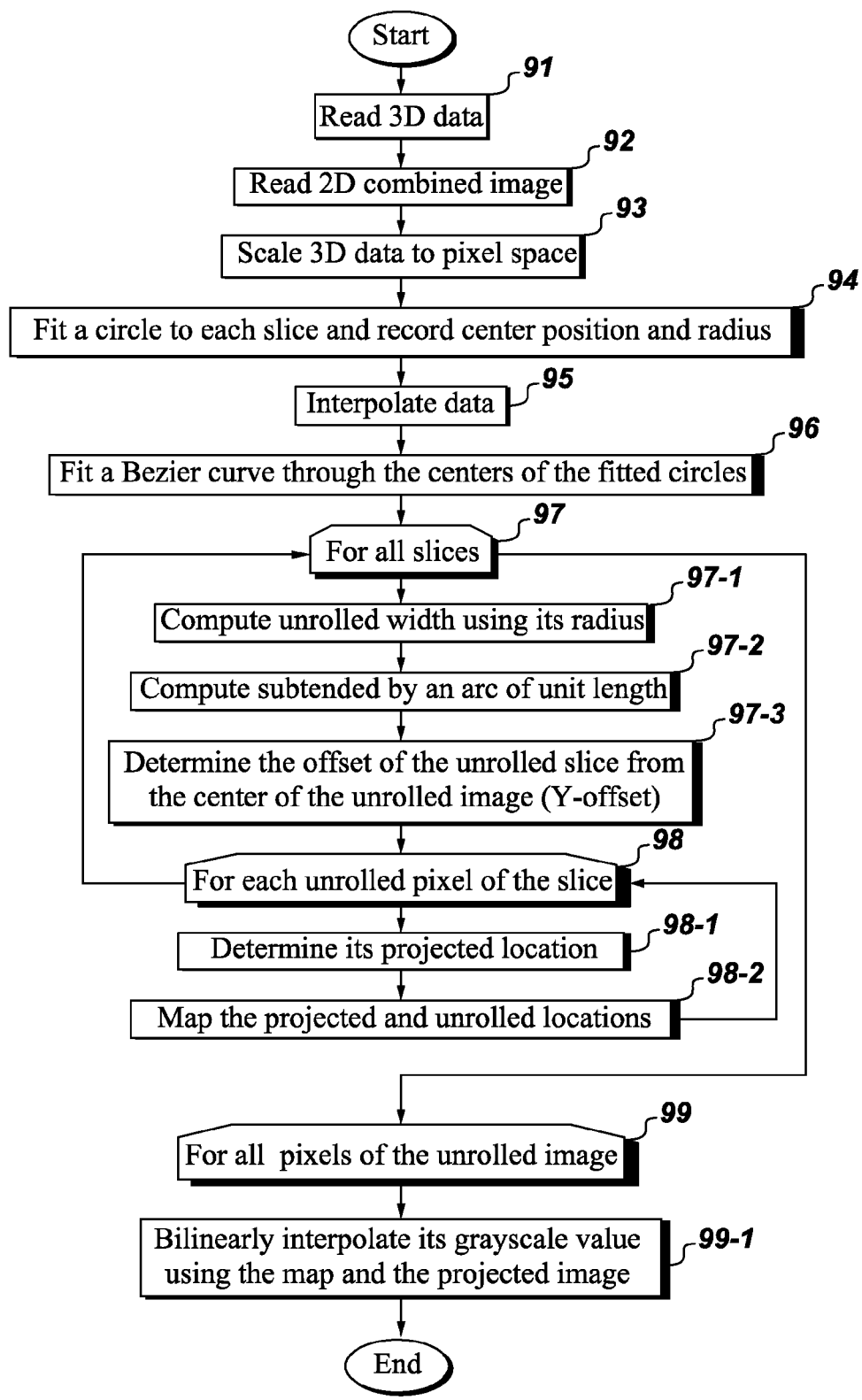
FIG. 8 is a flow diagram of a process used to convert a 3D image to an unrolled 2D image.

In FIG. 8, the process steps are numbered and show a rolled equivalent algorithm may start with reading the 3D data 91 calculated before and the 2D combined image 92. The 3D data is scaled to 3D pixel space to correspond spatially to the 2D combined image 93. Each slice perpendicular to the finger direction is modeled as an arc 94. The 3D data is then interpolated to have data every pixel 95. A Bezier curve is fitted through the centers of the arcs 96 to create a smooth finger curvature. For each slice the unrolled width 97-1 and subtended angle of each pixel 97-2 are calculated. The offset unrolled slice from the center is determined 97-3. For each unrolled pixel the projected location is determined 98-1 and the location of the unrolled pixel is calculated 98-2. For each pixel 99 a bilinear interpolation is applied to get the corresponding pixel value 99-1.

In yet another embodiment, the distortion map may use an arbitrary curve assumption of the finger cross section perpendicular to the long dimension of the finger and a different arbitrary curve assumption representing the center of the finger along its long dimension. Various combination of the above embodiment may also be used.

The unrolled image may then be compared to a database, or previously enrolled fingerprint records, matching the pattern 2D geometry of the unrolled image with previously captured images recorded by contact, rolled fingerprint methods. The comparison uses the ridge or minutia detail of the fingerprint to compare the recorded, contact rolled image to the new, non-contact, unrolled image. This may be accomplished by various methods including the use of algorithms such as cross correlation, template matching, difference subtraction, the NIST standard matching algorithm, or other method known in the art.

In certain embodiments polarization may be further applied to measure both specular and diffuse reflection; specifically wherein the polarized light is focused on a blue wavelength and a red wavelength region. Measurements of the specular and diffuse reflection may be used to differentiate authentic fingerprints from a forgery wherein the forgery uses a fake finger material that responds differently to the polarized light than does a real finger.

Specular reflection refers to the mirror-like reflection of light from a surface wherein the light is reflected in a consistent direction, rather than being scattered. If the surface roughness is much smaller than the wavelength of the incident light it appears flat and acts as a mirror. Diffuse reflection refers to the reflection of light from a surface in all directions in a broad range of directions.

As applied to fingerprints, fingers are known to diffuse light of different wavelengths differently so as to act more as a translucent material that scatters light in all directions versus a specular material that reflects light in a consistent direction. For example light having a red wavelength component penetrates deeper into a live finger where it becomes diffuse, producing a different character of the light with lower polarization than light with a blue wavelength component that reflects from the surface of the finger and maintains a higher degree of polarization. The difference in light penetration between the blue and red wavelengths, and thus the contrast seen on the features of the finger (the interior light makes the finger glow, reducing surface contrast) may be sufficient to authenticate real fingerprints from a spoof fingerprint Simply capturing the multiple states at both the blue and red colors may allow for forgery detection. In a case where the coloration of the fake finger material may be better matched to that of a real finger, the polarization effect described may enhance the ability to differentiate a real finger surface from a fake finger surface. This may be accomplished by using vectors constructed from selected feature values from combinations of one of two different wavelengths and one of four polarization states. Therefore, in certain embodiments a wavelength tuner may be used which is capable of adjusting the output light to at least two wavelength regions. In certain embodiments, the wavelength regions may comprise a red light component and a blue light component.

When two polarizers are used in imaging an object, where the polarizers are arranged parallel, specular reflection is emphasized. When the polarizers are arranged in a crossed direction, diffuse reflection is emphasized. Therefore, a combination of a parallel polarizer and blue illumination which reflects off the finger surface and maintains the polarized nature of the light can emphasize specular reflection and enhance image contrast. Furthermore, switching to a red light component, which penetrates into the finger, and using cross polarization, to enhance the depolarized light and suppress any specular reflected light off the surface, will result in an image glowing from within the finger with very little surface feature contrast. The difference in the surface feature contrast will emphasize the difference between a real image and a forgery. A wavelength tuner may be used to adjust the output light to the desired wavelength regions.

Figure 9:
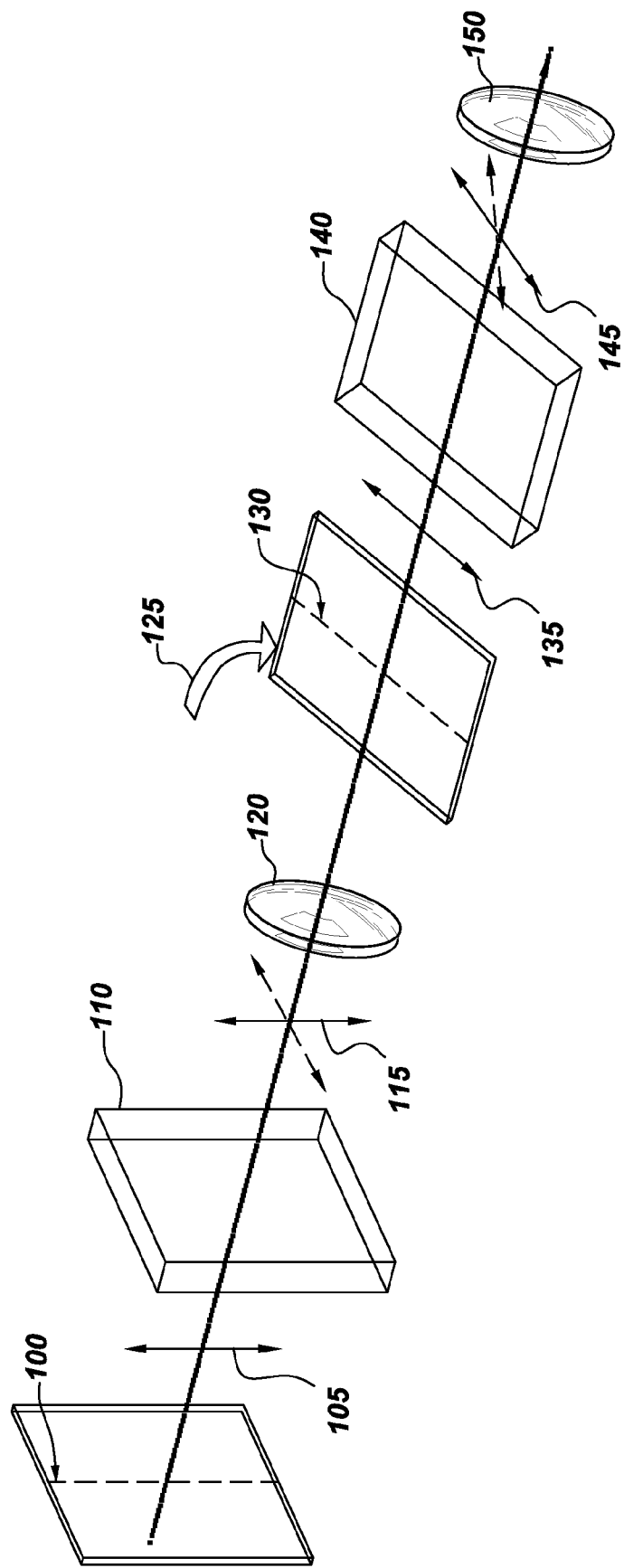
FIG. 9 is an illustration of an imaging system tracing polarized light through each stage of an imaging system.

In certain embodiments, two liquid crystal panels (LCPs), two polarizers and two birefringent lenses, acting as field lenses slightly displaced from the primary image, may provide four or more different optical path lengths and also different polarizations of light. This is shown in FIG. 3 for a window and FIG. 9 for a lens, which traces the polarized light at each stage through the described imaging system. Referring further to FIG. 9, when the light is first collected from the finger, it passes through a linear polarizer 100 and may be defined as a vertically orientated state. The first LCP 110 either passes the light unaltered in its original vertically polarized state 105, or rotates the light making it horizontally polarized 115. After the light passes through the LCP to the first birefringent lens element 120, the light will see a different index of refraction when horizontally polarized than when vertically polarized, shifting the image distance a small amount 125. To allow both the vertical and horizontal polarizations of light to pass to the remaining optical system, this light then passes through a second polarizer 130 oriented at 45° to the first polarizer, transmitting the same amount of light from each polarization. This polarizer may be adjusted to balance the light between the two possible images. The 45° polarized light after the second polarizer contains components of both the vertically polarized light and horizontally polarized light from the original subject 135. If the light were viewed through a linear polarizer oriented vertically, the light would appear as reflected from the finger seen in the primary image. However, if viewed through a horizontal linear polarizer, the light would appear as from the finger that is horizontally polarized, or as reflected from the finger.

To obtain two other focus positions, a second LCP 140 may be used to create two crossed polarization orientations 145, which work with the second birefringent lens element 150 to produce two more image positions. The changes in polarization thereby provide images from the finger relative to two states of polarization of the light as reflected from the finger. S-polarized light (light polarized out of the plane-of-incidence of the light illuminating and reflecting from the part) will reflect more from the surface of the finger, in the same manner that S-polarized light will reflect at a higher level than the P polarized light (light polarized in the plane-of-incidence) reflecting off a glass plate at an angle. In the opposite manner, P-polarized light tends to penetrate the surface layer of skin more, lighting up the interior of the finger, just as it will transmit through the glass more than the S-component. This effect is particularly pronounced on a finger at longer wavelengths where light penetration is greater in any case, causing the effect of the live finger glowing from within and having very low contrast surface feature definition.

Experimental Results

Image Capture

Figure 10A:
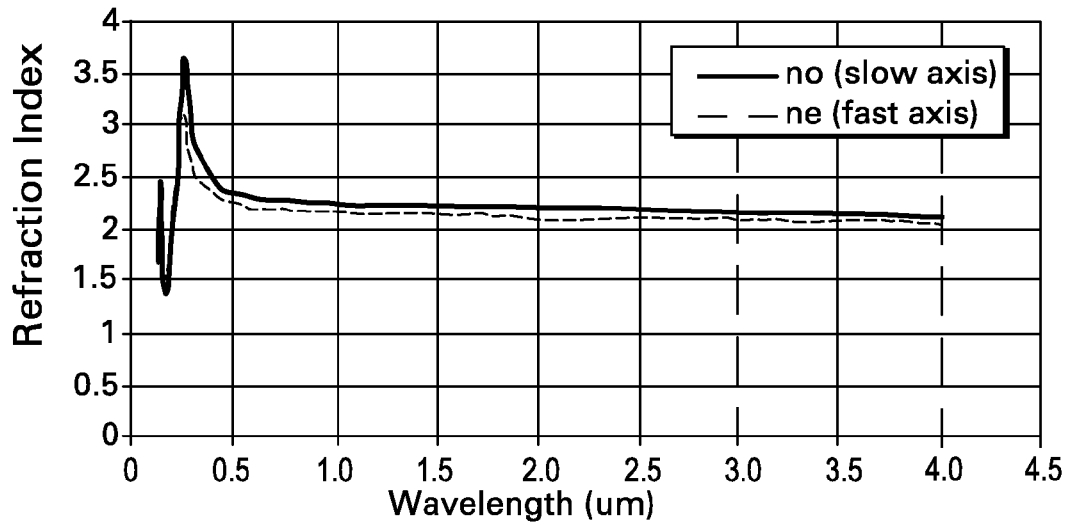
FIG. 10 shows the lens characteristics of lithium niobate.
Figure 10B:
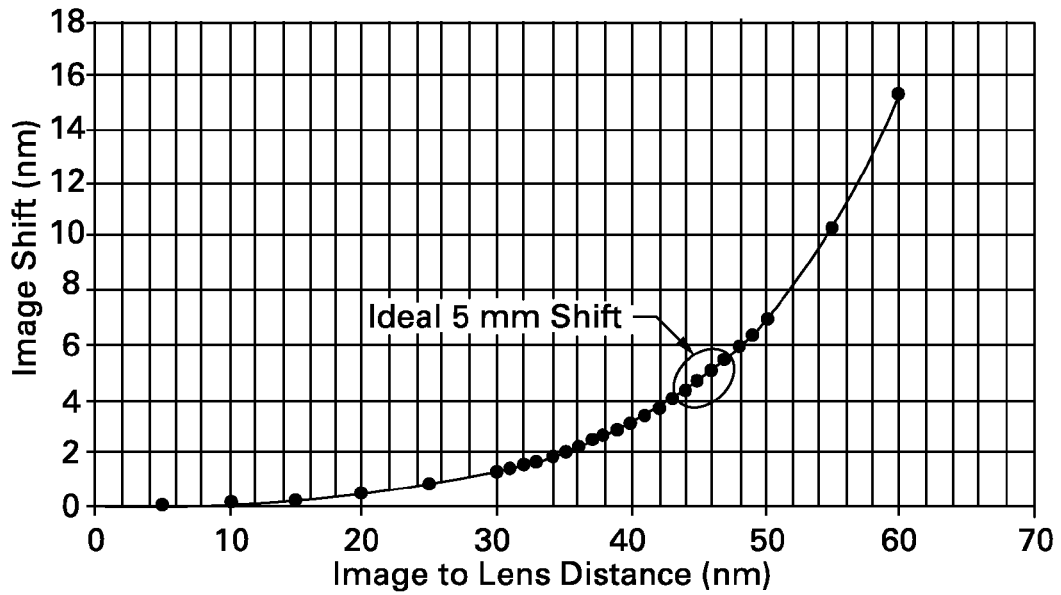

A system is configured using a birefringent lens made of lithium niobate to create the image shift. FIG. 10 illustrates its refractive index (A) as a function of wavelength along the extraordinary and ordinary axes. The resulting image shifts are also shown (B). There is a small, distinct change in refractive index sufficient to create an appropriate focal shift.

Figure 11:
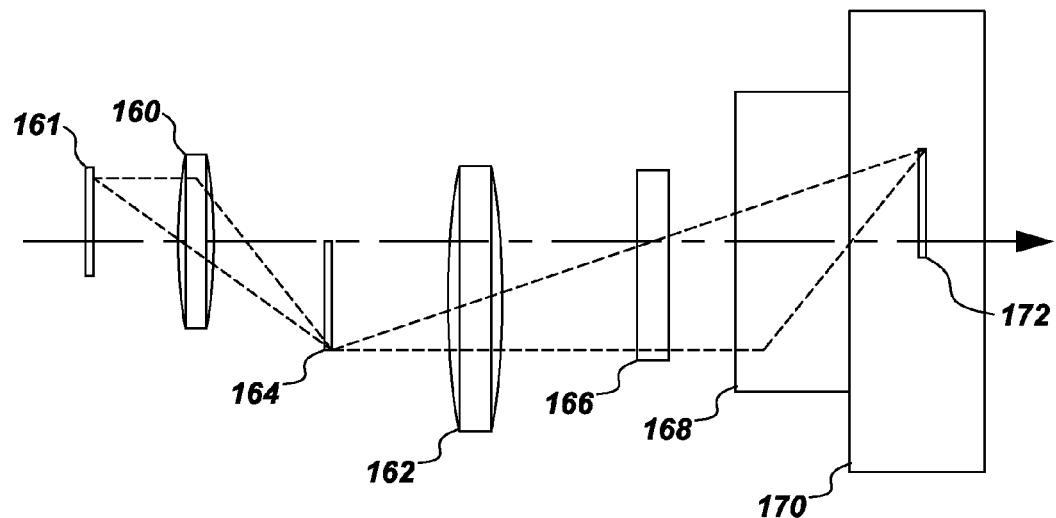
FIG. 11 is an illustration of a system using one birefringent lens and one LCP to create two focal positions.
Figure 12:
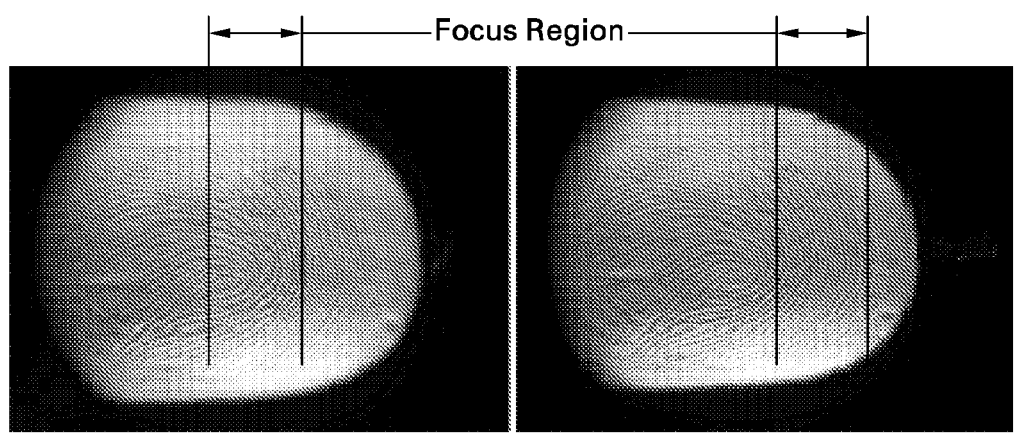
FIG. 12 shows the two focal positions created by one birefringent lens as seen by the focus clarity moving to more distant points on a finger.

FIG. 11 shows a front imaging lens 160 used to create an intermediate image 164 of a finger 161. The finger is represented as a solid line. The birefringent element lens 162 is positioned as a field lens close to the intermediate image 164 created, but with a small displacement. In this configuration, the birefringent lens acts as a magnifier and creates a virtual image (not shown). Two virtual images at different distances from the lens are created, one each for the two polarization orientations selected by the LCP 166. The virtual images were imaged 172, by the camera imaging lens 168, onto the camera 170. Depending on the voltage setting of the LCP, one of the two image positions is seen by the camera. Using the thin lens formula, $1/f=(n-1)/r=1/o+1/s$, where f is the focal length, r is the radius of the lens, o is the object distance, and s is the image distance, the shift in image distance between the two values of refractive indices (n) is calculated. The captured images of the shifted focal planes are shown in FIG. 12.

To create four images, a system, which includes two birefringent lens elements and two LCPs of a similar structure to that shown in FIG. 11, may be used.

Figure 13:
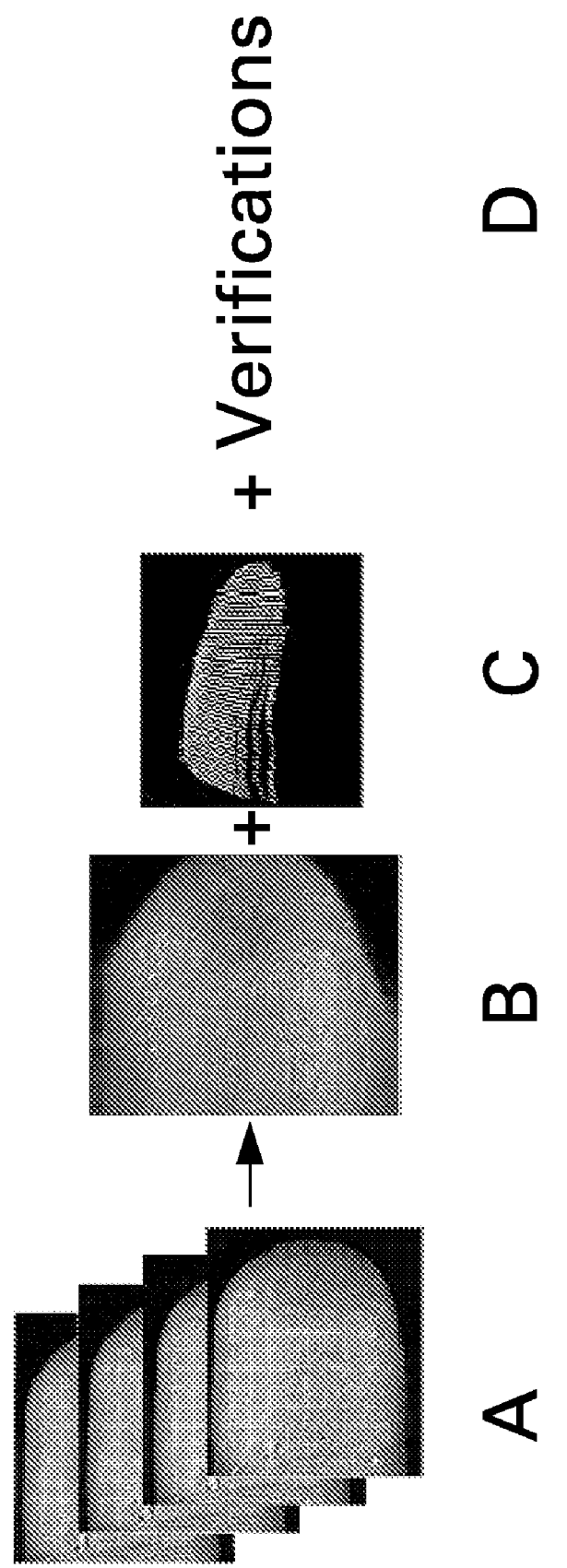
FIG. 13 shows the resultant high-resolution image and rolled equivalent image obtained from the four images captured.

As shown further in FIG. 13, the acquired images (a) may be used, in the method described in FIG. 7, to obtain a rolled equivalent (b), a three-dimensional finger model (c), and verification information (d).

Spoof Detection

A multispectral imaging method, based primarily on the difference in the spectral absorption profile between a real finger and a fake one, was employed using blue and red light. Images were collected at various rotated linear polarizations (each image representing different values of specular and diffuse components), and the images used to create the feature vectors representing the spectral and polarization diversity. An algorithm was used to extract complex wavelet transforms (CWT) and fast Fourier transform (FFT) features from the images and builds a supervised learning method to train Support Vector Machines (SVM) classifiers. Support vector machines (SVM) are machine-learning (supervised learning) methods used for classification.

Figure 14A:
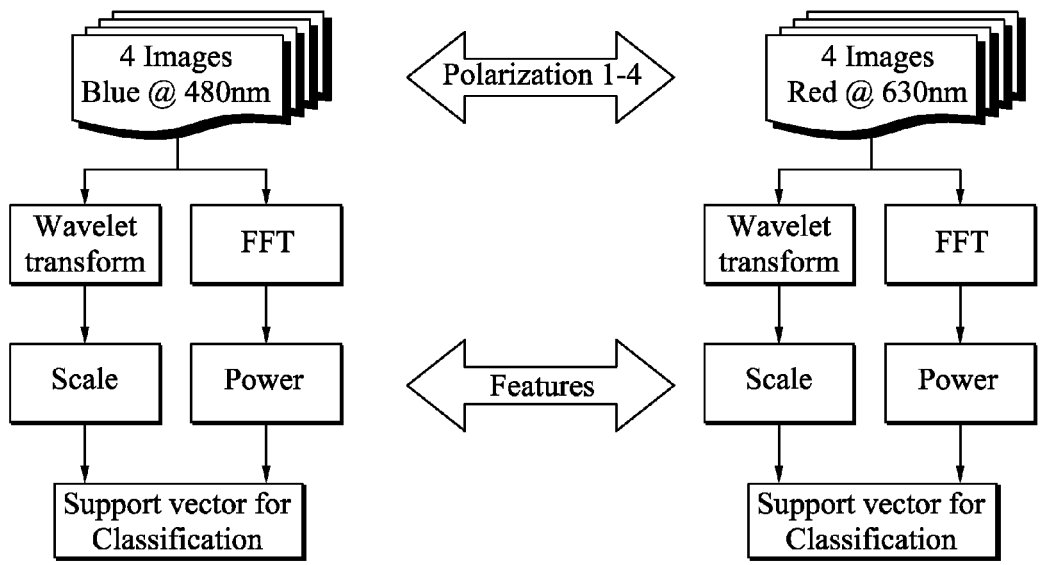
FIG. 14 is a flow diagram showing an embodiment of capturing training data and system implementation for spoof detection.
Figure 14B:
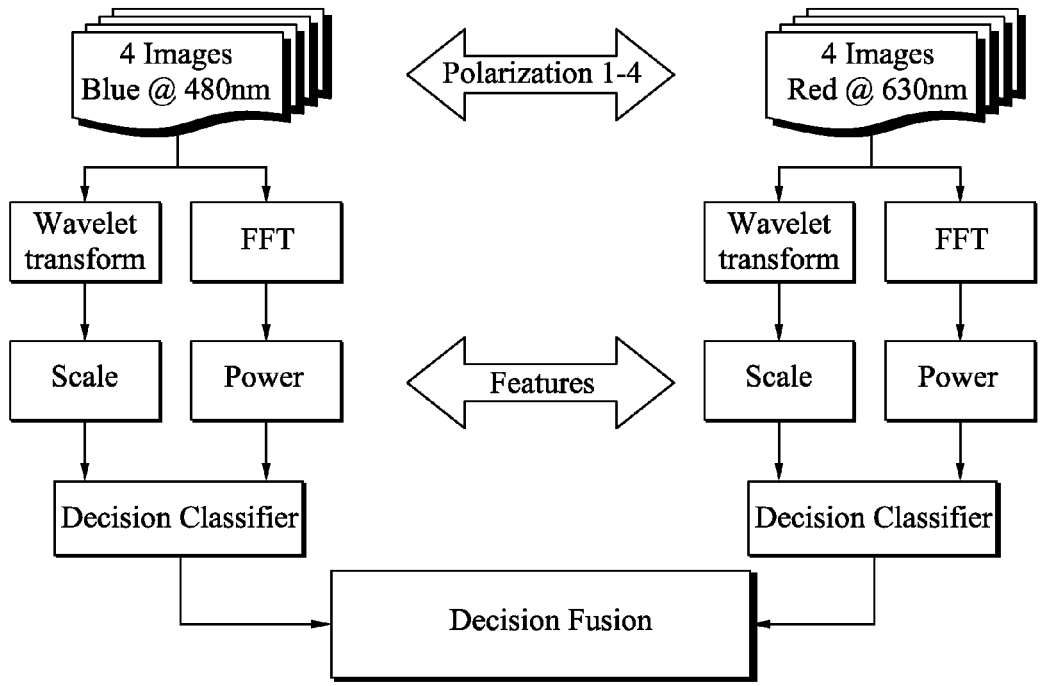

FIG. 14 shows the method used for spoof detection in more detail. During training, feature data was used as input data to the Support Vector Machine. During spoof detection implementation, the support vectors were used as the decision tool to differentiate the source of the fingerprint. Four images for each finger at 480 nm wavelength, referred to as Blue images, were obtained by changing the polarization. Another set of four images at 630 nm, referred to as Red Images, was also obtained. The image sets were analyzed using an algorithm leveraging complex wavelet transforms (CWT) and FFT to identify good patterns in the CWT co-coefficients. A final prediction of spoof was based on decision fusion using decision rules.

Figure 15:
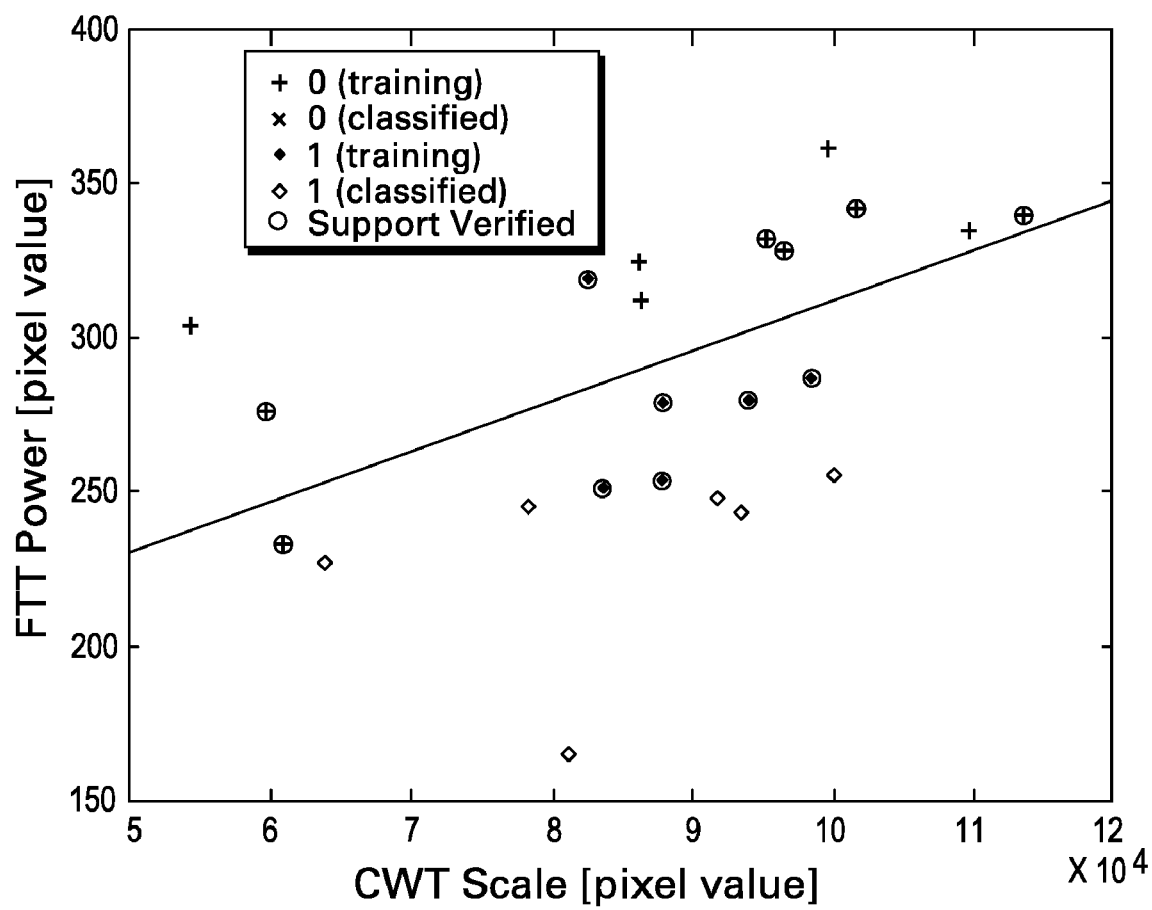
FIG. 15 shows a spoof detection dataset and the corresponding decision boundary hyperplane.

In another set of experiments, shown in, feature vectors were used to construct a separating hyperplane that maximizes the margin between the real fingers and spoof fingers. In FIG. 15 a hyperplane dataset is shown having a classification accuracy of 83%. The dataset consisted of 24 fingers: 12 real and 12 spoofs.

The invention may be embodied in other specific forms without departing from the spirit or essential characteristics thereof. The foregoing embodiments are therefore to be considered in all respects as illustrative rather than limiting on the invention described herein. The scope of the invention is thus indicated by the appended claims rather than by the foregoing description, and all changes that come within the meaning and range of equivalency of the claims are therefore intended to be embraced therein.

The invention claimed is:

1. A contactless method of imaging a three-dimensional fingerprint using polarization rotation comprising:
   illuminating a fingerprint and directing a reflected light from said fingerprint through an imaging system wherein said imaging system comprises an image capture device, a liquid crystal panel (LCP), and a birefringent element wherein the LCP and the birefringent element are positioned between said fingerprint and said image capture device such that the reflected light from said fingerprint passes through the LCP, the imaging unit, and the birefringent element;
   switching between two orientation states of the LCP to rotate the linear polarization of the reflected light;
   capturing a plurality of polarized images of said fingerprint wherein at least one image is captured from each of the orientation states of the LCP;
   registering the plurality of images of said fingerprint to create pixel correspondence between the resultant registered images;
   combining the plurality of registered images to a fused image;
   calculating a depth of structural features of the fused image of said fingerprint using a depth from focus algorithm; and
   generating a two-dimensional rolled equivalent image of said fingerprint from the calculated depth of structural features and the fused image using an algorithm wherein the algorithm simulates image distortions corresponding to the reverse of the projection of the fingerprint surface on a two dimensional projection.

2. The method of claim 1 wherein the birefringent element comprises a birefringent window, a birefringent lens, or a beam splitter.

3. The method of claim 1 wherein calculating the depth of structural features uses at least one of a depth from focus calculation and a depth from defocus calculation.

4. The method of claim 1 wherein the algorithm used to represent the reverse of the projection of the fingerprint surface on a two dimensional projection comprises:
   creating a 3D point cloud data set using pixel intensities from the plurality of polarized images;
   creating a distortion map from the 3D point cloud; and
   using said distortion map to transforming the pixel space of the fused image into a new pixel space, said new pixel space representing a two-dimensional rolled equivalent image.

5. The method of claim 4 wherein the distortion map is generated using the dimensions of a finger from which the fingerprint image was obtained and wherein the dimension are based on :
   a cylindrical assumption of the finger;
   a cylindrical assumption for each cross section of the finger perpendicular to the long dimension of said finger and a Bezier curve representing the center of said finger along its long dimension;
   an arbitrary curve assumption of the finger cross section perpendicular to the long dimension of said finger and a different arbitrary curve assumption representing the center of said finger along its long dimension; or
   a combination thereof.

6. The method of claim 1 wherein the registering the plurality of images comprises ortho-rectification.

7. The method of claim 1 further comprising one of:
   verifying the source of the two-dimensional rolled equivalent image by comparing said two-dimensional rolled equivalent image to a database containing rolled-fingerprint images from multiple sources; and
   determining if said fingerprint image is from an authentic fingerprint source or a forgery, wherein the forgery uses a fake finger material.

8. The method of claim 7 wherein the determining if said fingerprint image is from an authentic fingerprint source comprises:
   illuminating said fingerprint using a plurality of different wavelength regions of light;
   capturing a plurality of polarized images of said fingerprint from each of the different wavelength regions;
   calculating the amount of surface specular reflection and diffuse reflection of the fingerprint image using the polarized images; and
   comparing the amount of specular reflection to an amount of diffuse reflection of said fingerprint image.

9. The method of claim 8 wherein the plurality of different wavelength regions comprises a red light component and a blue light component.

10. A contactless system for imaging a fingerprint using polarization rotation comprising:
    an illumination source for directing illuminating light towards said fingerprint;
    an image capture device for capturing reflected light from said fingerprint;
    a first liquid crystal panel (LCP), and a first birefringent element wherein the first LCP and the first birefringent element are positioned between said fingerprint and said image capture device such that reflected light from said fingerprint passes through the LCP and the birefringent element;

a voltage source to apply voltage to the first LCP to change orientation states; and a processor coupled to the image capture device, wherein said processor is capable of;

capturing a plurality of polarized images of said fingerprint wherein at least one image is captured from each of the orientation states of the LCP;

registering the plurality of images of said fingerprint to create pixel correspondence between the resultant registered images;

combining the plurality of registered images to a fused image; and calculating the depth of structural features of said fingerprint using a depth from focus algorithm;

generating a two-dimensional rolled image of said fingerprint from the calculated depth of structural features and the fused image using an algorithm, wherein the algorithm simulates the reverse of the projection of the fingerprint surface on a two dimensional projection.

11. The system of claim 10 wherein the first birefringent element comprises a birefringent window, a birefringent lens, or a beam splitter.

12. The system of claim 10 further comprising:

a second birefringent element, a second LCP and a polarizer wherein each is optically aligned with the first birefringent element and first LCP; and wherein said second LCP and said polarizer are positioned between the birefringent elements such that the optical path length of the reflected light passing through said system has at least three different values based on the orientation states of the first and second LCPs and the polarizer.

13. The system of claim 11 wherein the first birefringent element is a first birefringent lens and further comprises:

a second birefringent lens and a second LCP wherein said second birefringent lens and second LCP are optically aligned with the first birefringent lens and first LCP;

a first imaging lens followed by a telecentric stop wherein said first imaging lens and telecentric stop is disposed between the fingerprint and the imaging system and operates to focus the reflected light from the fingerprint to form an intermediate image plane at or near to the first birefringent lens; and wherein the second birefringent lens is positioned such that said intermediate image plane is formed between the first and second birefringent lenses.

14. The system of claim 11 wherein the first birefringent element is a first birefringent lens and further comprises:

a second birefringent lens and a second LCP wherein said second birefringent lens and second LCP are optically aligned with the first birefringent lens and first LCP; and wherein the first and second birefringent lenses operates as a close-up diopter lens to the image capture device.

15. The system of claim 11 wherein the first birefringent element is a first beam splitter optically aligned with the first LCP and wherein changes in the orientation state of the first LCP operates to change the optical path of reflected light from the fingerprint traversing through said beam splitter.

16. The system of claim 15 further comprising a second beam splitter and a second LCP wherein the second beam splitter and second LCP are positioned between the first beam splitter and first LCP and the image capture device.

17. The system of claim 10 wherein the illumination source comprises a wavelength tuner capable of adjusting the output light to at least two wavelength regions.

18. The system of claim 17 wherein the at least two wavelength regions comprises a red light component and a blue light component.

19. The system of claim 10 wherein the processor is further capable of at least one of:

verifying the source of the said two-dimensional equivalent rolled image by comparing said two-dimensional equivalent image to a database, said database containing rolled-fingerprint images from multiple sources; and determining if said fingerprint image is from an authentic fingerprint source or a forgery, wherein the forgery uses a fake finger material.

20. The system of claim 19 wherein determining if said fingerprint is from an authentic fingerprint source or a forgery comprises the step of comparing surface feature contrast of said fingerprint image to a real fingerprint image.

21. The system of claim 20 wherein comparing surface feature contrast comprising measuring surface contrast while illuminating said finger using at least one of a red light component, a blue light component, and cross-polarized light.

22. The system of claim 19 wherein determining if said fingerprint is from an authentic fingerprint source or a forgery comprises the steps of;

calculating image features related to surface specular reflection and diffuse reflection of a fingerprint image using polarized images from two or more different wavelengths;

comparing the amount of specular reflection to an amount of diffuse reflection of said fingerprint image; and determining if said fingerprint image is from an authentic fingerprint source or a forgery, wherein the forgery uses a fake finger material.

23. The system of claim 22 wherein calculating image features related to surface specular reflection and diffuse reflection of a fingerprint image is done by creating complex wavelet transforms (CWT) and fast fourier transform (FFT) features from the images representing spectral and polarization diversity.

24. The system of claim 22 wherein determining if said fingerprint image is from an authentic fingerprint source or a forgery, is done by creating a supervised learning method to train Support Vector Machines (SVM) classifiers to predict whether finger is spoof or real based on decision fusion using decision rules.

\* \* \* \* \*